United States Patent [19]

Choi et al.

[11] Patent Number: 5,029,165
[45] Date of Patent: Jul. 2, 1991

[54] METHOD OF ALLOTTING LINKS AND ROUTING MESSAGES FOR A COMMON CHANNEL TYPE SIGNALLING TRANSFER POINT

[75] Inventors: Yanghee Choi; Yunghee Lee; Yungsik Bak; Yunghwan Cha, all of Chungnam; Daeyung Chun, Daeku; Yungman Kang, Seo-Ku, all of Rep. of Korea

[73] Assignees: Electronics and Telecommunications Research Inst.; Korea Telecommunications Authority, both of Rep. of Korea

[21] Appl. No.: 367,633

[22] Filed: Jun. 19, 1989

[30] Foreign Application Priority Data

Jun. 17, 1988 [KR] Rep. of Korea ............... 88-7346

[51] Int. Cl.$^5$ .............................................. H04J 3/24
[52] U.S. Cl. ................................ 370/110.1; 370/94.1; 370/95.1
[58] Field of Search ............... 370/110.1, 95.1, 58.1, 370/58.2, 60, 94.1, 94.3

[56] References Cited

U.S. PATENT DOCUMENTS 4,580,259  4/1986  Harada et al. ............... 370/58.2
4,887,265  12/1989  Felix ............................ 370/94.1

*Primary Examiner*—Douglas W. Olms
*Assistant Examiner*—Min Jung
*Attorney, Agent, or Firm*—Evenson, Wands, Edwards, Lenahan & McKeown

[57] ABSTRACT

A method of allotting the signal links and routing the signal messages in the signalling transfer points of a common channel signalling system which are level type signalling transfer points for carrying out message transfer functions based on the common channel signalling No. 7 protocol of the ITTCC. Each signalling transfer point includes a signalling link selection value composed of a number of bits, signal data links, signal links, signal network functions, clusters and groups, connected in such a manner that a signalling transfer point includes a certain number of signal network functions, each signal network function including a certain number of signal links, each signal link being connected to one signal data link. The signalling transfer point includes a number of clusters of signal links (equal to the number of signal network functions) grouped in a plurality of clusters (equal to the number of signal links). In this system, if a level has a malfunction, replacement levels are available, and the determination as to which cluster has the replacing level can be easily made. As a result, it is always possible to carry out the functions of the signalling transfer point, so long as all the signal network functions are not out of order simultaneously, or at least as long as all the signal links or all the signal data links are not out of order simultaneously.

2 Claims, 3 Drawing Sheets

METHOD OF ALLOTTING LINKS AND ROUTING MESSAGES FOR A COMMON CHANNEL TYPE SIGNALLING TRANSFER POINT

FIELD OF THE INVENTION

The present invention relates to a method for allotting the signal links and routing signal messages in the signalling transfer points of a common channel signalling system in which the signalling transfer points have a level type structure. More particularly, the present invention pertains to such a method in which the level functions of one signalling transfer point are associated with the level functions of another signalling transfer point so that the performance of the signalling transfer points is enhanced, the performance of the whole signal network is improved, and the transmission rate of the signal messages is increased. The signalling transfer points can perform the functions according to the levels of the message transfer part of the common channel signalling No. 7 protocol of the International Telephone and Telegraph Consultative Committee.

BACKGROUND OF THE INVENTION

It is a predictable trend that future telecommunications will have collectively integrated functions due to the amazingly rapid development of semiconductors, computers, and data transmission technologies. Therefore, instead of signal information which is used during the communication network exchange period being transmitted together with the user's information, as is now conventional, it will be an imperative demand that common channel signalling be introduced for transmitting the signal information through a common channel separate from the transmission line for the user's information. The development of a signalling transfer point for exclusively perfoming the transmission of such signal information is an important task which will bring a new era in automated information.

SUMMARY OF THE INVENTION

Therefore, it is an object of the present invention to provide a method for allotting the signal links of a common channel signalling system in such a manner that the performance of the signalling transfer points is improved, and to provide a routing method for efficiently transmitting the signal messages to their destinations.

BRIEF DESCRIPTION OF THE DRAWINGS

The object and advantages of the present invention will become more apparent from the following description of a preferred embodiment of the present invention, with reference to the attached drawings in which.

DESCRIPTION OF A PREFERRED EMBODIMENT

Figure 1:
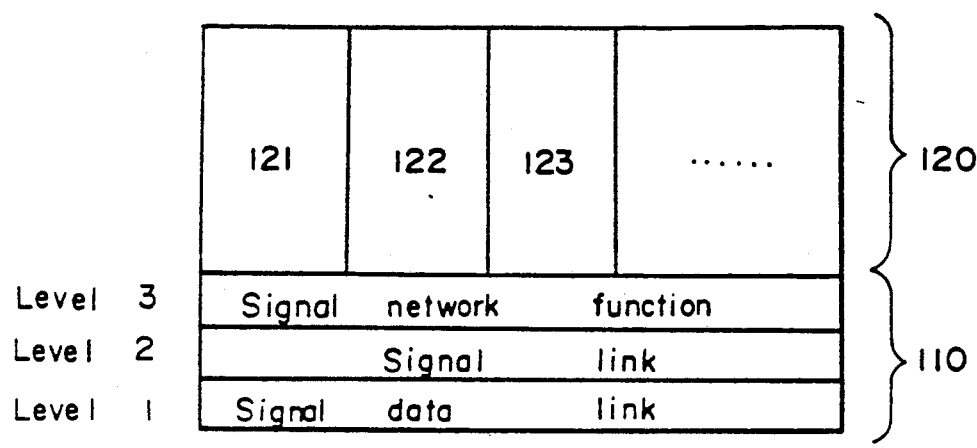
FIG. 1 is a schematic illustration of the level structure of the common channel signalling No. 7 protocol of the International Telephone and Telegraph Consultative Committee.

FIG. 1 shows a multi-level signal information transmission system which is operated by means of a protocol for performing functions such as a signal data link function in level 1, a signal link function in level 2, and a signal network function in level 3, all the levels belonging to the message transfer part protocol of the common channel signal network protocols of the International Telephone and Telegraph Consultative Committee, and the signal information transmission system representing a signalling transfer point according to the present invention.

Figure 2:
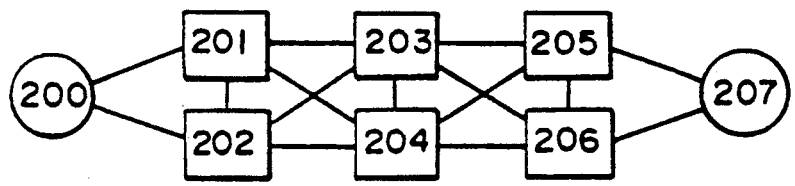
FIG. 2 is a schematic illustration of the structure of a common channel signal network between two end points of a signalling transfer point.
Figure 3:
FIG. 3 is a schematic illustration of the signal message routing labels utilized in the present invention.

The system of FIG. 1 includes an energy transfer section 110, consisting of level 1 to level 3 of the above mentioned protocols, and a user's section 120 consisting of a telephone user section 121, a signal link control section 122 and a general data communication network user secton 123. As shown in FIG. 2, the end points of the system are located at the opposite ends 200, 207 of a signalling transfer point, and the information exchanges between them are carried out through the signalling transfer points 201 to 206. Therefore, the signal end point which directly provides services to the users may be an electronic switching system, and its service-providing capability depends on the signal message transmission speed of the signalling transfer point and on its reliability The signal message transmitted between the signal end points 200, 207 includes routing labels as shown in FIG. 3, and the function of the signalling transfer point is to transmit the pertinent signal message to their destinations by referring to the routing labels On the routing labels, OPC represents the originating point of the signal message (OPC standing for Originating Point Code), while DPC (Destination Point Code), represents the destination point of the signal message. The signal message which is being transmitted toward the destination is sent in accordance with a transmission sequence, and in order to divide the load among the different signal links which perform the level 1 and the level 2 functions between the signalling transfer points, a signal link corresponding to the designated SLS (signalling link selection) value is selected, thereby sending the message to the selected link.

Among the protocols as shown in FIG. 1, the user section 120 is composed of software, while the message transfer section 110 is composed of special elements such a multiple processors, because it has to process and transmit a plurality of signal messages simultaneously.

Figure 4:
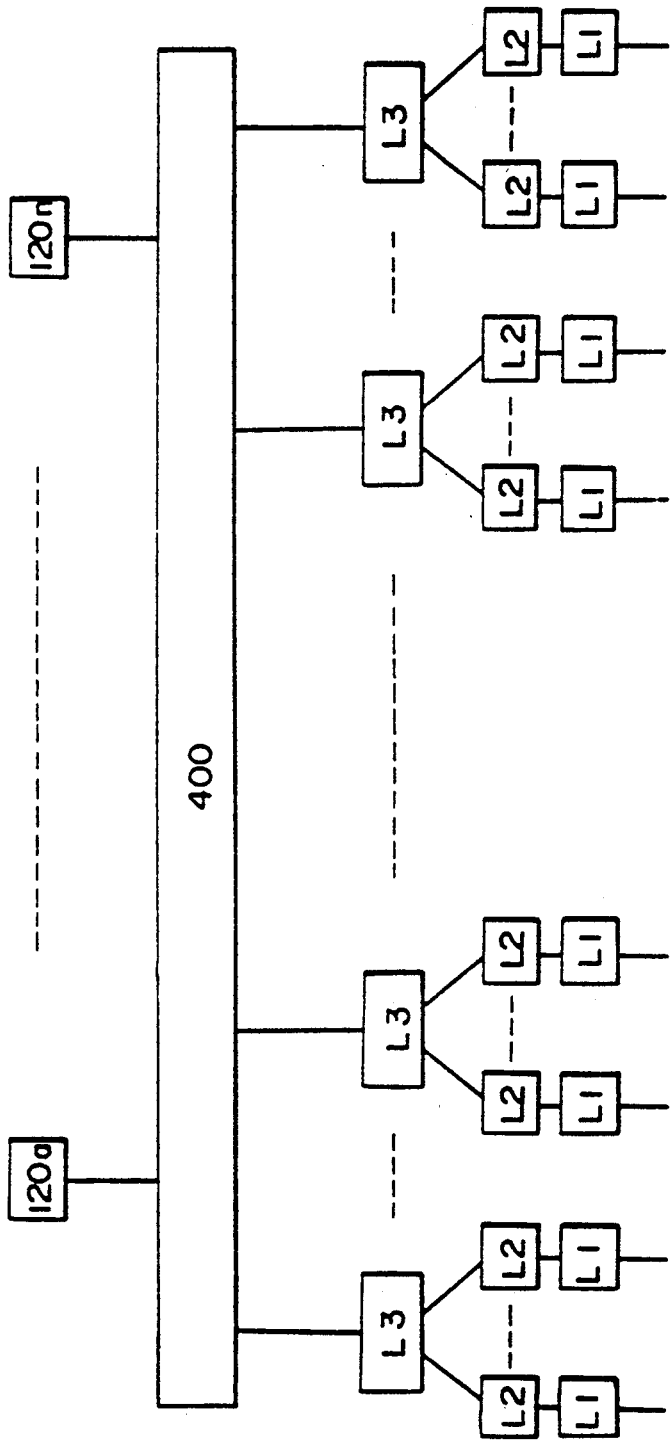
FIG. 4 shows a signalling transfer point having a level type structure according to the present invention.

FIG. 4 shows the structure of a signalling transfer point which is of a level type having the signal data link function in level 1, the signal link function in level 2 and the signal network function in level 3, all of the levels belonging to the protocols of the message transfer section 110 mentioned above. A certain number of signal network functions $L_3$ are connected through a connector section 400 to user sections $120a$ to $120n$ in such a manner that mutual communication is possible. Further a certain number of signal links $L_2$ are connected to each signal network function $L_3$, while one signal data link $L_1$ is connected to each signal link $L_2$.

The signal network functions $L_3$ of the upper level are provided with connector sections for communication between them, so that the signal network function $L_3$ could be utilized when control data or signal messages between the signal network functions are transferred.

The arrangement of connecting a plurality of signal links $L_2$ to each signal network function $L_3$ is provided for the sake of economy, but a single signal data link $L_1$ is connected to each signal link $L_2$ due to the characteristic protocol function of the message transfer section 110 shown in FIG. 1.

In such a signalling transfer point, there are many cases of localization in which some signal messages fed into the signal data link $L_1$ and the signal link $L_2$ are outputted again through the same signal link $L_2$ and the signal data link $L_1$, and when the signal traffic is uniformly distributed over all the signal data links $L_1$, the performance of the signalling transfer point is enhanced, at the same time reducing the delay in the transmissions of signal messages. If the destination of the signal message is the same signalling transfer point, there is no need for the signal message to be transmitted to other signalling transfer points. When there are many such localizations of the signal messages, the speed of information transmission is increased.

It is important to consider how the signal links $L_2$ belonging to one signal network function $L_3$ within a signalling transfer point should be connected to other signal links $L_2$ belonging to another signalling transfer point, and how the SLS value should be selected. It is likewise important to consider how the signal messages fed from a signal network function $L_3$ to a signal link $L_2$ can be outputted through a signal link $L_2$ belonging to the same signalling transfer point, without going through another signal network function $L_3$ belonging to another signalling transfer point.

These methods will be described below respectively, referring to FIG. 5.

First the allotments of the signal links $L_2$ are carried out as follows:

(1) Within a signalling transfer point having signal network functions $L_3$ as the root nodes, there are subtrees covering signal links $L_2$ and signal data links $L_1$. A tree having a signal network function $L_3$ as the root node and having signal data links $L_1$ as terminal nodes can be called a cluster. In this cases the signal links can be connected as follows:

(1.1) Assuming that the SLS value within a signal message is k bits, and $F=2^k$, F signal links $L_2$ are connected to each signal network function $L_3$, and one signal data link $L_1$ is connected to each signal link $L_2$, thereby forming a cluster.

(2) Assuming that the clusters having the same signalling point code (SPC) for the signalling transfer points are called a group, and also assuming that on signalling transfer point includes C clusters, if C is larger than F, then there are [C/F]groups, and one group includes F clusters, while, if C is smaller than F or equals F, then there is only one group, and that one group includes F clusters. In this case, an SLS value as defined in (2.1) below is assigned to each signal link $L_2$ belonging to each cluster.

(2.1) Within each cluster belonging to each group, a certain SLS value is assigned respectively to all of the F signal links $L_2$. That is, all the F signal links $L_2$ belonging to the same cluster are assigned the same SLS value, and the signal data links $L_1$ belonging to the F different signalling transfer points are connected to each other.

Figure 5:
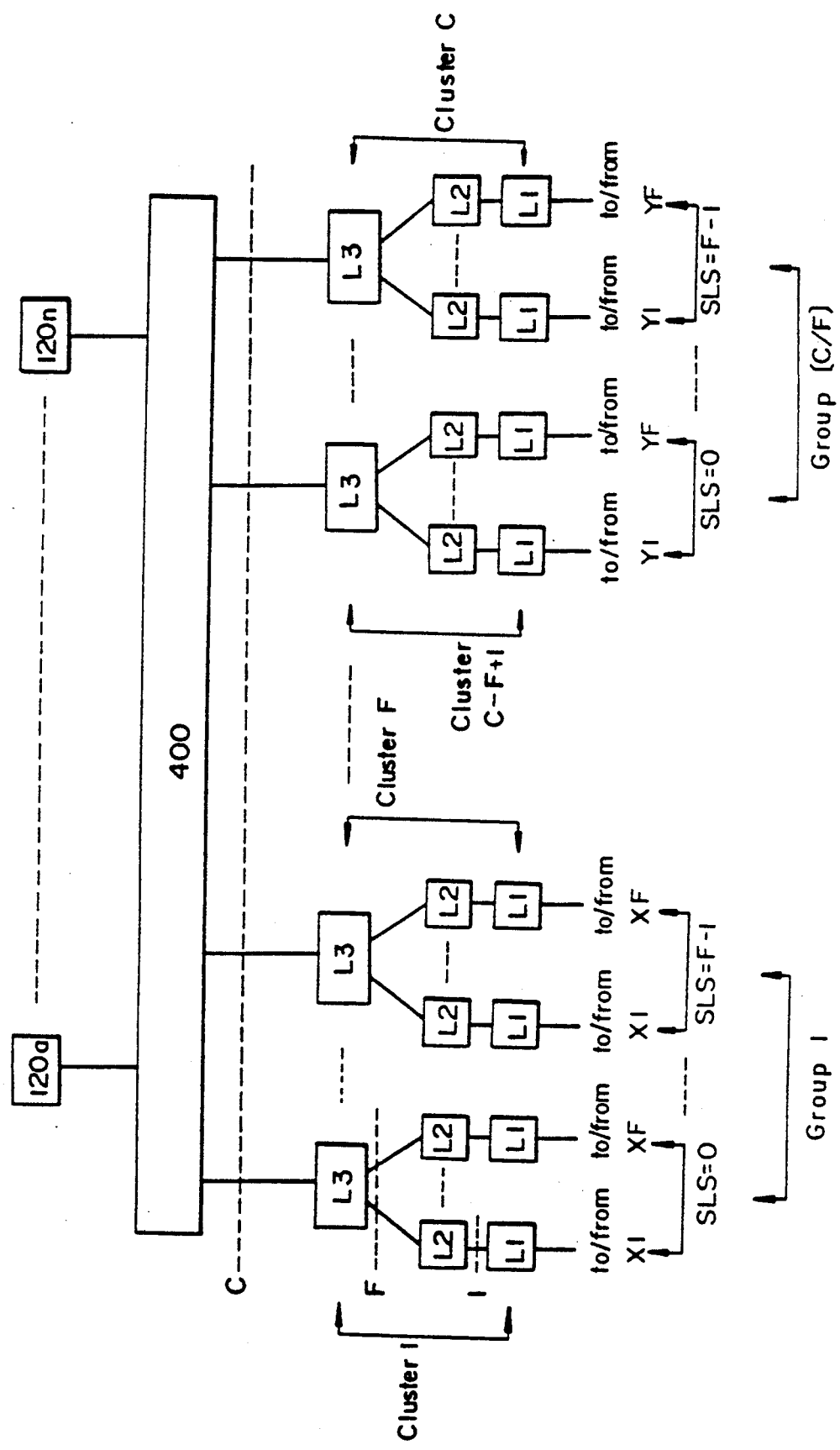
FIG. 5 shows a signalling transfer point illustrating its structure after allotment of level 2 signal links according to the present invention.

Thus, FIG. 5 shows the structure of a signalling transfer point in which the signal data links $L_1$ and the signal links $L_2$ are connected as shown in paragraph (1.1) above, and the SLS values are assigned to the signal links $L_2$ in sequence from the leftmost point to the right based on the value of F for each cluster.

The F signal data links $L_1$ within each cluster are respectively connected to F different signalling transfer points, and the signal links $L_2$ are respectively provided with the same unique SLS value, this being utilized for the selection of the links when routing according to the SLS values of the routing labels. Further, the group includes F clusters, and each cluster is connected to F different signalling transfer points, the distinction between the clusters being made by means of the SLS values which are assigned to the signal links $L_2$ within the respective clusters.

When the signal messages fed into each cluster reach the signal network function $L_3$ through the signal data link $L_1$ and the signal link $L_2$, the signal network function $L_3$ detects the DPC (destination point code), as shown in the routing table of FIG. 3, to identify the destination point. Then the signal network function $L_3$ transmits the signal message to the signalling transfer point which is connected to a signal data link $L_1$ connected to a signal link $L_2$ provided with the same SLS value as that of the signal message existing in the present signalling transfer point, which is on the signalling route capable of sending the message to the DPC. Here, only if the signal network function $L_3$ finds that the SLS value of the signal message is same as the SLS value assigned to the signal links $L_2$ of its own cluster is localization possible.

Assuming that the total number of the clusters within a signalling transfer point is C, and that the number of the signal links $L_2$ connected to each cluster is F, there will exist as many signal data links $L_1$ as the multiple of C by F (i.e., $C \times F$).

Therefore, in the case where the signal data links $L_1$ and the signal links $L_2$ are connected and allotted by the methods of paragraph (1.1) and (2.1) above, the probability of localization of signal messages within the signalling transfer point is $F/C \times F$, that is, $1/C$. The reason for this is that the SLS provided in the routing label within the signal message is furnished from the user section, and the signal network function $L_3$ plays only the role of selecting the signal link having the same SLS value as that furnished by the user section, when routing the pertinent signal message. Therefore, if a signal message fed to a cluster has the same SLS value as that assigned to the cluster, it has only to select a destination. However, because there are many signal links $L_2$ which are connectable through signal data links $L_1$ respectively to F units of different signalling transfer points, the probability of the occurrence of localization in the signal traffic is $1/C$.

The disadvantage of such a method is that, even if the signalling transfer point connected to the proper signal route communicable to the relevant DPC is secured, if the SLS values are different from each other, the connector section 400 coupling the signal network functions $L_3$ must be used in order to find the signal link $L_2$ having the same SLS value, thereby delaying the signal message transmission time. In order to overcome such disadvantage, a signalling transfer point for exclusively carrying out new transfers is provided The routing method for preventing such time delay under this arrangement is described below.

In this method, only the connections and allotments of the signal data link $L_1$ and the signal link $L_2$ based on the method of paragraph (1.1) above are needed, and the assignment of SLS based on the method of paragraph (2.1) above are rendered unnecessary. That is, it is required only that the signal links $L_2$ connected to the adjacent signalling transfer points in which the signal links $L_2$ within each group of the signalling transfer point have the same SPC value should have different SLS values from one another.

The routing method is as follows.

(3) When each signal message is fed through the signal link $L_2$ within its own cluster, each signal network function $L_3$ within the signalling transfer point performs the following functions, based on the routing labels as shown in FIG. 3.

(3.1) If the DPC lies in that signal network function $L_3$, and a localization exists, the user section of that signal network function $L_3$ is sought in order to make the signal message reach the pertinent user section through the connector section so that telecommunication within the signal network functions $L_3$ is possible.

(3.2) If the signalling transfer point is connected to a signal end point and the DPC does not lie within that signal network function $L_3$, it is determined whether a signal link $L_2$ having the same SLS value as that of the signal message exists within that cluster, and whether such a signal link $L_2$ lies on the signal route of the pertinent DPC. If such determinations are affirmative, the message is directly transmitted to the pertinent signal link $L_2$.

If no localization occurs, then a cluster is sought which is connected to a signalling transfer point lying on the pertinent signal route and having a signal link $L_2$ in which the SLS value is same as that of the pertinent signal message. Then the signal message is transmitted to that cluster.

(3.3) If the signalling transfer point is not connected to a signal end point, if the DPC of the signal message does not lie within that signal network function $L_3$, if localization has occurred, and if the signalling transfer point connected to a signal link $L_2$ and signal data link $L_1$ within the cluster of that signal network function $L_3$ lies on the pertinent route for the DPC, then without confirming the SLS value assigned to the cluster of that signal network function $L_3$, the signal message is transmitted directly through the signal link $L_2$.

If the conditions are same as above except that localization has not occurred, a cluster is sought which is connected to a signalling transfer point lying on the pertinent signal route and connected through a signal link $L_2$ in which the SLS value is the same as that of the pertinent signal message. Then the message is transmitted to the cluster thus found, through a connector section 400 for communication between the signal network functions $L_3$.

In the case of the signal network functions $L_3$ belonging to a signalling transfer point which is located adjacent to the signal end points 200, 207, that is, in the case of the signal network functions belonging to the signalling transfer points 201, 202, 205 and 206 as shown in FIG. 2, signal messages are fed into the signalling transfer point first through the signal link $L_2$, and therefore, the above mentioned operation is carried out based on the method of paragraphs (3.1) and (3.2) above.

A message fed into a signalling transfer point may have a destination either in that signalling transfer point or in some other signalling transfer point, and in this case the signal link $L_2$ which has the same SLS value as that assigned to the routing label of the signal message has to be found through the signal link $L_2$ relevant to the pertinent DPC.

According to paragraph (3.1) above, the destination point lies in that signalling transfer point, and therefore, localization is excluded As to the possibility of localization under paragraph (3.2) above, the signal route for sending the message to the DPC lies within that cluster, and the signal link $L_2$ which has the same SLS value as that assigned to the routing label of the pertinent signal message has to be found, resulting in the probability of localization being 1 C%, where C is the total number of clusters within the signalling transfer point.

Meanwhile, in the signalling transfer points 203, 204 which are not connected to the signal end points 200, 207, but play only the role of transmitting signal messages, operations according to paragraph (3.1) or paragraph (3.3) above are possible. Under paragraph (3.1), the destination point lies within the signalling transfer point, and therefore the desirability of localization is excluded. Under paragraph (3.3), signal messages fed into a cluster can be transmitted regardless of the SLS value, insofar as the signal message is transmitted within the pertinent group. Therefore, the connector section 400 for communication between the signal network functions $L_3$ is not utilized, resulting in the probability of localization being 1/[C/F]%, where C/F represents the total number of groups within the signalling transfer point.

When the routing methods described above are applied, if a signalling transfer point includes only one group, that is, if C=F, both the signalling transfer point which is connected to a signal end point and that which is not connected to a signal end point have a localization probability of 100%.

If C is larger than F, the signalling transfer point connected to a signal end point will have a localization probability of C% while the signalling transfer point not connected to a signal end point will have a localization probability of 1/[C/F]%.

According to a recommendation made by the International Telephone and Telegraph Consultative Committee, SLS is composed of 4 bits. Therefore, a signalling transfer point can be connected to a maximum of 16 other signalling transfer points (including signal end points), and a signalling transfer point can have a group which includes 16 signal network functions $L_3$ and 16×16 signal links $L_2$ and signal data links $L_1$. When such a signalling network system is adopted, and if the connection and allotment methods of paragraph (1.1) above are applied, a localization probability of 100% exists. Further if the routing methods of paragraphs (3.1) and (3.2) above are applied, there will also exist a localization probability of 100% for the signal messages.

According to the present invention as described above, a signalling transfer point which is provided with unique ways of allotting signal links $L_2$ and routing the signal network functions $L_3$ can speedily process signal traffic and has signal links uniformly allotted based on the SLS value. Therefore, dividing of the signal traffic load can be done, and routing is also made simple. Further, the functions of the signalling transfer point are carried out in a modular way for each cluster and each group, and therefore, even if a disorder occurs in a level (level 3 — level 1), the disordered function can be easily replaced by another level (level 1×level 3)

belonging to another cluster within the same group, thereby overcoming malfunctions in the system.

Such features can be provided through a dual arrangement of hardware which performs physical functions, or a multiplication of functions as great as the number F of clusters within a group can be achieved, thereby providing high reliability of the system.

The F clusters within a group are connected to F other signalling transfer points, and therefore, the signal network functions $L_3$ within a group know all the states of all the levels (level 3×level 1). If a level is out of order, a replacement cluster can be determined easily Then the routing method as described above can be applied in order to transmit the signal message by the replacing cluster. Therefore, so long as all the signal network functions $L_3$ in the F units within a group are not out of order simultaneously, or at least so long as all the signal links $L_2$ or all the signal data links $L_1$ are not out of order simultaneously, the functions of the signalling transfer point can be carried out.

What is claimed is:

1. A method for allotting signal links and routing signal messages in a signalling system having a plurality of common channel type signalling transfer points, each signalling transfer point being a level type signalling transfer point for carrying out message transfer functions and including a plurality of signal network functions of level 3, a plurality of signal links of level 2, and a plurality of signal data links of level 1, each signal network function of level 3 being coupled to a uniquely associated plurality of the signal links of level 2, with each of the signal links of level 2 being coupled to a uniquely associated signal data link of level 1 to form a signalling cluster with the signal network function of level 3 as a root node of the signal data links of level 1 as terminal nodes, the signal links of level 2 associated with each signal network function of level 3 being sequentially designated for identification purposes, each signal message including a routing label made up of an originating point code, a destination point code, and a signalling link selection value, the signalling link selection value having a number of bits k, said method comprising the steps of:

(a) separating the clusters of a signalling transfer point into C/F groups of F clusters per group, where C is the number of clusters in the signalling transfer point, and $F=2^K$: and (b) assigning a signalling link selection value to each signal link of level 2;

whereby the signal data links of level 1 within each transfer point are connected to the correspondingly designated signal data links of level 1 of the other transfer points.

2. The method according to claim 1, wherein step (b) comprises assigning the same signalling link selection value to each of the signal links of level 2 within a cluster of each group.

* * * * *